US 6,747,817 B2

(12) United States Patent
Takato

(10) Patent No.: US 6,747,817 B2
(45) Date of Patent: Jun. 8, 2004

(54) MACRO LENS, AND CAMERA COMPRISING THE SAME

(75) Inventor: Hideyasu Takato, Hino (JP)

(73) Assignee: Olympus Corporation, Tokyo (JP)

( * ) Notice: Subject to any disclaimer, the term of this patent is extended or adjusted under 35 U.S.C. 154(b) by 18 days.

(21) Appl. No.: 10/304,076

(22) Filed: Nov. 26, 2002

(65) Prior Publication Data

US 2003/0103269 A1 Jun. 5, 2003

(30) Foreign Application Priority Data

Nov. 27, 2001 (JP) ........................ 2001-361096

(51) Int. Cl.$^7$ .............................. G02B 9/06; G02B 9/14
(52) U.S. Cl. ......................................... 359/794; 359/785
(58) Field of Search ................................ 359/705, 785, 359/786, 787, 788, 794

(56) References Cited

FOREIGN PATENT DOCUMENTS

| JP | 60-188918 | 9/1985 |
| JP | 07-181390 | 7/1995 |
| JP | 08-015609 | 1/1996 |
| JP | 11-038316 | 2/1999 |

*Primary Examiner*—David N. Spector
(74) *Attorney, Agent, or Firm*—Pillsbury Winthrop LLP

(57) ABSTRACT

The invention relates to a fast macro lens that is well corrected for aberrations even at close range, and a camera comprising the macro lens. The macro lens comprises, in order from its object side, a first lens group G1 having positive power and a second lens group G2 having positive power. In the first lens group G1 a negative meniscus lens component concave on its object side is located nearest to the object side of the macro lens. Upon focusing from an object point at infinity to the closest object point, the first G1 and the second lens group G2 move independently toward the object side of the macro lens while the spacing between them varies.

26 Claims, 8 Drawing Sheets

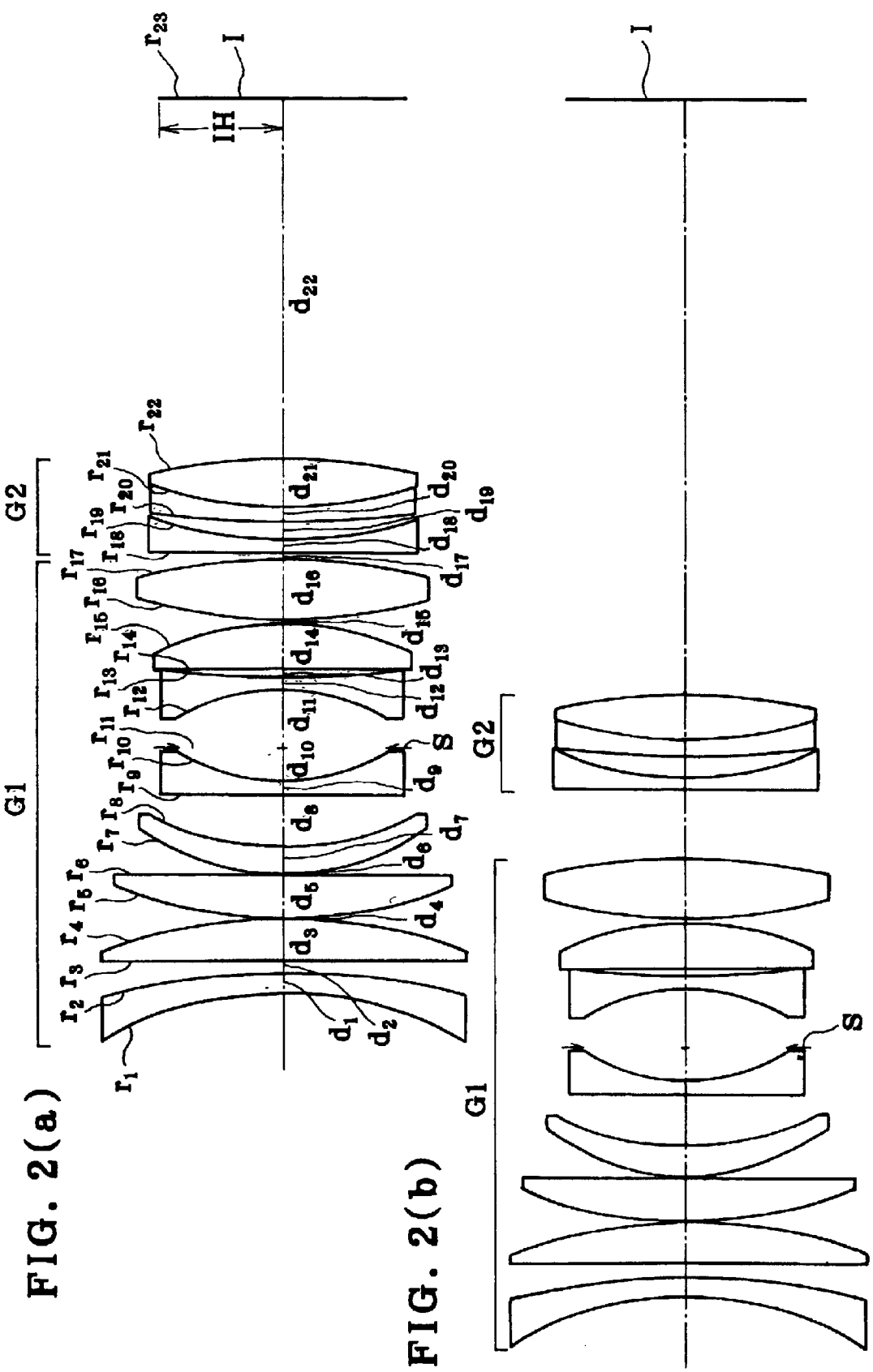

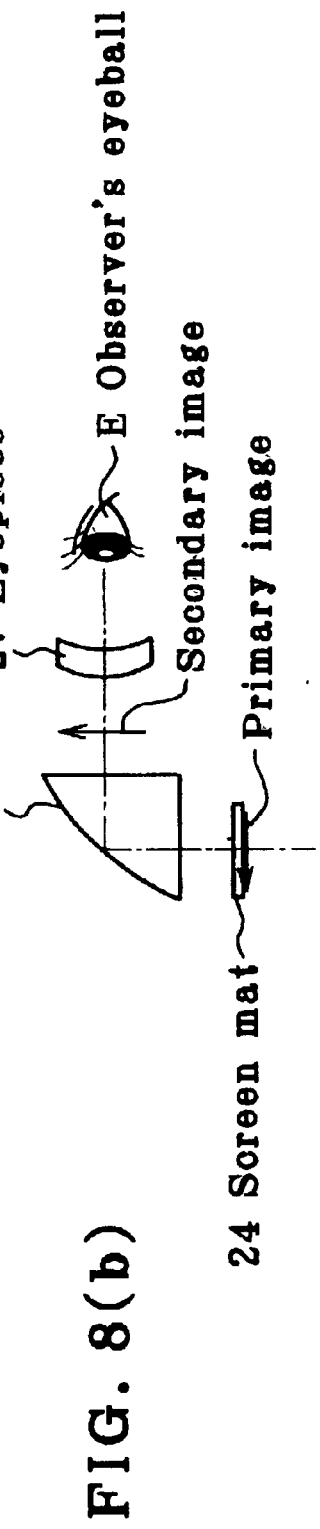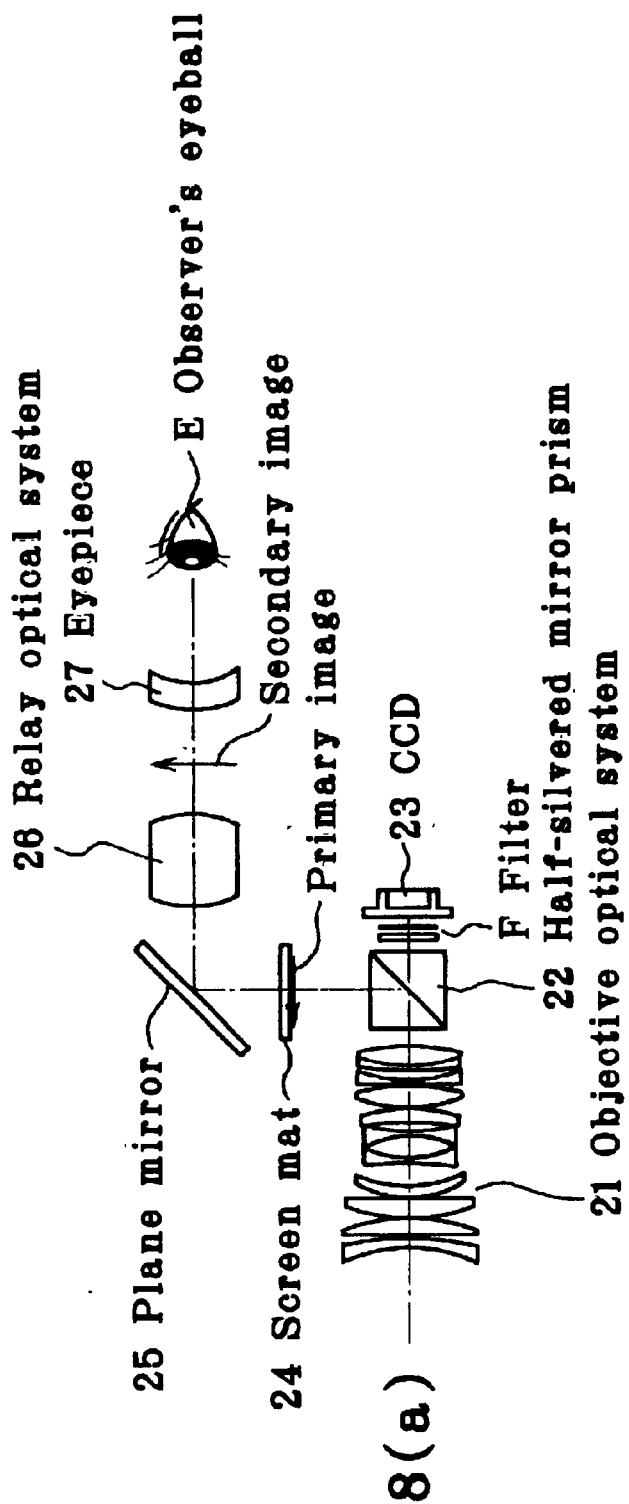
FIG. 8(b)
FIG. 8(a)

MACRO LENS, AND CAMERA COMPRISING THE SAME

The application claims benefit of Japanese Application No. 2001-361096 filed in Japan on Nov. 27, 2001, the contents of which are incorporated by this reference.

BACKGROUND OF THE INVENTION

The present invention relates to a macro lens and a camera comprising the same. The present invention is particularly suitable for silver-halide or digital cameras. More specifically, the present invention is directed to a macro lens suitable for use as an interchangeable lens applicable to silver-halide or digital single-lens reflex cameras.

So far, many macro lenses have been proposed as interchangeable lenses for single-lens reflex cameras or digital single-lens reflex cameras.

For focusing macro lenses, floating techniques involving the movement of a plurality of groups have been used, because of a large fluctuation of spherical aberrations between at infinity and at close range.

Conventional macro lenses, for the most part, give weight to designs having a magnification of about 1/10 while they are well balanced at infinity and at close range, and so their phototaking performance at infinity is inferior to that of general lens systems that are in no sense any macro lens systems.

Many macro lenses have large fluctuations of spherical aberrations and field curvature at infinity to close range upon focusing, and so such aberrations are reduced by means of floating.

With large-aperture macro lenses, however, it is difficult to control these fluctuations, and so field curvature and coma in particular become noticeable in short range regions.

SUMMARY OF THE INVENTION

In view of such problems with the prior art as explained above, one object of the present invention is to provide a fast macro lens that is well corrected for aberrations even upon close-range shooting, and a camera comprising the same.

Another object of the present invention is to provide a large-aperture macro lens that has reduced aberration fluctuations at every range from infinity to close range and an F-number of about 1.8.

Yet another object of the present invention is to provide a macro lens best suited for half film size and an image circle nearly half the diagonally 135-long format.

According to the first aspect of the present invention, these objects are achievable by the provision of a macro lens, characterized by comprising, in order from its object side, a first lens group having positive power and a second lens group having positive power, wherein in the first lens group a negative meniscus lens component concave on its object side is located nearest to the object side of the first lens group, and upon focusing from an object point at infinity to the closest object point, the first lens group and the second lens group move independently toward the object side of the macro lens while the spacing between them varies.

According to the second aspect of the present invention, there is provided a macro lens characterized by comprising, in order from an object side thereof, a first lens group having positive power, a second lens group having negative power and a third lens group having positive power, wherein in the first lens group a negative meniscus lens component concave on its object side is located nearest to the object side of the first lens group, and upon focusing from an object point at infinity to the closest object point, the lens groups move independently toward the object side of the macro lens while a spacing between adjacent lens group varies.

In what follows, why the aforesaid arrangements are used, and how they work will be explained.

The macro lens of the present invention may be used on cameras in general. In particular, this macro lens is best suited for use on a single-lens reflex camera (irrespective of whether or not lens replacement is needed), which must take a back focus enough to mount therein an observation optical path-dividing mechanism. The macro lens of the present invention is also applicable to just only silver-halide silver cameras but also to other cameras using electronic image pickup devices such as solid-state image pickup devices or CCDs.

Comprising two positive lens groups, the micro lens of the present invention makes correction for aberrations upon focused at close range by means of the floating action ensuing from independent movement of them.

For lens replacement, a macro lens for single-lens reflex cameras must take a given back focus length. Although the lens of the present invention is a medium-telephoto lens system having a view angle of $2\omega \approx$ about 24°, its focal length with respect the view angle reduces by nearly half that of the 135 format. With the lens system according to the specification of the present invention, it is thus not easy to make sure of the back focus.

To ensure this back focus, the first lens component located nearest to the object side of the first lens group having positive power must be formed of a negative lens component. To bring the principal point at a position in the rear of the lens system and on the image side of the lens system, the first lens component should preferably be defined by a negative meniscus lens component concave on its object side. With this arrangement, it is possible to take an adequate back focus length and, hence, make sure of space large enough to receive a quick-return mirror.

Thus, the first micro lens of the present invention has the structure comprising, in order from an object side thereof, a first lens group having positive power and a second lens group having positive power, wherein in the first lens group a negative meniscus lens component concave on an object side thereof is located nearest to the object side of the first lens group, and upon focusing from an object point at infinity to the closest object point, the first lens group and the second lens group move independently toward the object side of the macro lens while the spacing between them varies.

Alternatively, the second macro lens of the present invention has the structure comprising, in order from an object side thereof, a first lens group having positive power, a second lens group having negative power and a third lens group having positive power, wherein in the first lens group a negative meniscus lens component concave on an object side thereof is located nearest to an object side of the first lens group, and upon focusing from an object point at infinity to the closest object point, the lens groups move independently toward the object side of the macro lens while the spacing between adjacent lens group varies.

In this embodiment of the present invention, the three lens groups are positioned in a nearly symmetric power profile of +-+, and aberrations upon focusing at close range are corrected by the floating action ensuing from their independent movement.

To hold back aberration fluctuations every range from infinity to close range while close-range performance is improved, floating should preferably be carried out by the movement of the three lens groups of +-+ power profile. With this arrangement, fluctuations of spherical aberrations and coma with focusing can be reduced as much as possible, and field curvature fluctuations can be easily corrected as well.

It is here understood that the two-group arrangement is overwhelmingly favorable for the associated lens barrel structure, and so can be much more reduced in terms of performance variations by fabrication errors than the three-group arrangement.

A stop should preferably be inserted in the first lens group in the case of the two-group arrangement, and in the second lens group in the case of the three-group arrangement.

Where the height of a marginal ray minimizes is in the first lens group in the case of the two-group arrangement, and in the second lens group in the case of the three-group arrangement; it is most preferable to locate the stop at that position, at which the stop can be made more compact because its diameter can become short. At that position, the marginal ray minimizes in height, taking the form of a substantially afocal ray, so that even when the stop displaces to and fro due to stop-mounting position misalignments, etc., there is no or little noticeable inconvenience.

It is also desired to locate a plurality of positive lens components between the negative meniscus lens component and the stop.

For the first lens group, it is preferable that at least two positive lens components are located after the first lens component. To correct the first lens group for spherical aberrations, positive refracting power is required; to make better correction for them, however, at least two positive lens components are necessary. With this arrangement, it is also possible to avoid making the diameter of the stop located in the rear of these lens components larger than required.

It is desired that the lens components positioned just before and just after the stop be formed of negative lens components.

When the negative lens components are disposed before and after the stop, a relatively symmetric arrangement is obtained with respect to the stop. This arrangement is also favorable for correction of distortions.

The first lens group in the case of the two-group arrangement, and the combined first and second lens group in the case of the three-lens arrangement comprises, in order from an object side thereof, a negative meniscus lens component concave on its object side, a positive lens group, a positive lens component in which the object-side surface thereof is smaller in terms of the absolute value of the radius of curvature than the image-side surface thereof, a negative lens component in which the image-side surface thereof is smaller in terms of the absolute value of the radius of curvature than the object-side surface thereof, a stop, a negative lens component in which the object-side surface thereof is smaller in terms of the absolute value of the radius of curvature than the image-side surface thereof, and a positive lens component in which the image-side surface thereof is smaller in terms of the absolute value of the radius of curvature than the object-side surface thereof.

This arrangement is of the so-called Gauss type. To enter light from the first lens component into the subsequent negative lens component while it is converged little by little, the positive lens group and the positive lens component in which its object-side surface is smaller in terms of the absolute value of the radius of curvature than its image-side surface are provided.

In this arrangement, aberrations are corrected by an air lens having strong negative power, which is defined by the two lens components with the stop interposed between them.

The subsequent positive lens component serves to prevent the diameter of a light beam from becoming large while the symmetry of the Gauss type optical system is maintained and the angle of incidence of light on the subsequent second lens group (the third lens group in the case of the three-group arrangement) is controlled.

It is noted that the lens component used may be either a single lens component or a cemented lens component. Although it is acceptable to cement adjacent lens components together, it is understood that aberrations can be well corrected by use of the Gauss type, and so it is preferable to construct all lens components other than those in the final lens group (all lens components in the first lens group in the case of the two-group arrangement, and in the first and second lens groups in the case of the three-group arrangement) of single lenses, thereby achieving cost reductions.

It is also preferable that the second lens group in the case of the two-group arrangement, and the third lens group in the case of the three-group arrangement comprise a positive doublet component where positive and negative lens components are cemented together.

The final lens group (the second lens group in the case of the two-group arrangement, and the third lens group in the case of the three-group arrangement) should preferably be constructed of a reduced number of lens components for the purpose of making the length of the lens group short. More preferably, however, the positive doublet component should be used because correction of aberrations can be made with such a reduced number of lens components.

When an image is formed on the light-receptive surface of an electronic image pickup device, it is required to diminish the angle of incidence of an off-axis chief ray on that light-receptive surface. This also makes some contribution to correction of chromatic aberration of magnification.

To make satisfactory correction for chromatic aberrations, it is desired to use at least one positive lens component and at least one negative lens component in the final lens group. To be more effective, these lens components should be cemented together.

Several conditions preferable for the aforesaid arrangements or embodiments are now explained.

Preferably, the focal length of the first lens should comply with the following condition (1):

$$-4 < f_F/f_L < -1 \qquad (1)$$

where $f_F$ is the focal length of the negative meniscus lens component located nearest to the object side of the macro lens, and $f_L$ is the focal length of the macro lens upon focused on an object point at infinity.

As the upper limit of −1 to condition (1) is exceeded, the power of this lens becomes too strong and every aberration from spherical aberration to come to field curvature becomes too large to be corrected at other lenses. At less than the lower limit of −4, it is difficult to make sure of any adequate back focus because the power of the first lens becomes weak.

If the upper and the lower limit are defined as mentioned below, it is then possible to make the aforesaid effects much more satisfactory.

$$-2.5 < f_F/f_L < -1.8 \quad (1)'$$

The first lens should also preferably comply with the following condition (2):

$$-12.5 < (r_1+r_2)/(r_1-r_2) < -0.85 \quad (2)$$

where $r_1$ is the radius of curvature of the object-side surface of the negative meniscus lens located nearest to the object side of the macro lens, and $r_2$ is the radius of curvature of the image-side surface of the negative meniscus lens located nearest to the object side of the macro lens.

As the lower limit of −12.5 to condition (2) is not reached, the negative refracting power of the first lens becomes weak, and so it is difficult to make sure of any back focus as is the case with condition (1). Exceeding the upper limit of −0.85 to condition (2) is not preferred because the negative refracting power of the first surface becomes too strong to cause noticeable fluctuations of spherical aberrations at every range from infinity to the closest object point.

More preferably in this case, the lower limit to condition (2) should be defined as given below.

$$-8.5 < (r_1+r_2)/(r_1-r_2) < -0.85 \quad (2)'$$

When a large-aperture lens system has an F-number of up to 1.8, it is difficult to make correction for spherical aberrations and coma. To ensure a large-aperture F-number in the case of the two-group arrangement, it is thus preferable to limit the focal length of the first lens group within the following range:

$$0.5 < f_1/f_L < 1.8 \quad (3-1)$$

where $f_1$ is the focal length of the first lens group, and $f_L$ is the focal length of the macro lens upon focused on an object point at infinity.

Likewise in the three-group arrangement, it is preferable to limit the focal length of the first lens group within the following range:

$$0.5 < f_1/f_L < 1.8 \quad (3-2)$$

where $f_1$ is the focal length of the first lens group, $f_3$ is the focal length of the third lens group, and $f_L$ is the focal length of the macro lens upon focused on an object point at infinity.

As the lower limit of 0.5 to condition (3-1) or (3-2) is not reached or the power of the first lens group becomes strong, an axial marginal ray is largely refracted at a fast F-number, and so it is difficult to make correction for spherical aberrations on an object point at infinity. As the upper limit of 1.8 to these conditions is exceeded, the lens system becomes large.

To make better correction for spherical aberrations on an object point at infinity, it is preferable to make the refracting power of the first lens group in the case of two-group arrangement weaker or to comply with condition (3-1)', and the refracting power of the first lens group in the case of the three-group arrangement stronger or comply with condition (3-2)'.

$$1.0 < f_1/f_L < 1.8 \quad (3-1)'$$

$$0.5 < f_1/f_L < 1.0 \quad (3-2)'$$

At greater than the lower limit of 1.0 or 0.5 to these conditions, it would be possible to achieve a faster lens system of improved performance.

In the case of the two-group arrangement, focusing is well achievable by floating ensuing from the movement of the respective lens groups. However, the bending of spherical aberrations at close range tends to become large. To minimize this, it is desired to limit the focal length of the lens group located nearest to the image side of the macro lens within the range defined by the following condition (4-1):

$$1.8 < f_2/f_L < 3.5 \quad (4-1)$$

where $f_2$ is the focal length of the second lens group, and $f_L$ is the focal length of the macro lens upon focused on an object point at infinity.

Likewise in the three-group arrangement, it is desired to limit the focal length of the third lens group within the range defined by the following condition (4-2):

$$1.8 < f_3/f_L < 3.5 \quad (4-2)$$

where $f_3$ is the focal length of the third lens group, and $f_L$ is the focal length of the macro lens upon focused on an object point at infinity.

As the lower limit of 1.8 to these conditions is not reached, there is grave deterioration in performance such as spherical aberrations and field curvature at close range. Exceeding the upper limit of 3.5 to these conditions is not preferable because there is an increase in the quantity of movement of the second or third lens group upon focusing.

More preferably, conditions (4-1) and (4-2) should be reduced down as given below.

$$2.2 < f_2/f_L < 3.0 \quad (4-1)'$$

$$2.2 < f_3/f_L < 3.0 \quad (4-2)'$$

Inasmuch as the range defined by these conditions is satisfied, it would be possible to achieve the aforesaid effects in a more favorable manner.

By determining the focal lengths of the respective lens groups as explained above, the performance of the macro lens at close range can be fully achieved even when it is designed in such a way that its performance at infinity is on the same level as that of ordinary lenses.

In view of a large-aperture macro lens, the macro lens of the present invention should preferably comply with the following conditions (5), (6) and (7):

$$-1.0 < MG < -0.4 \quad (5)$$

$$7° < SW < 16° \quad (6)$$

$$1.0 < F < 3.0 \quad (7)$$

Here MG is the maximum magnification, SW is the half view angle of incidence of a diagonal ray on the maximum image height in the image pickup range of a camera body upon focused at infinity, provided that when the image pickup range of the image pickup surface is arbitrarily variable, SW is the maximum value in the possible widest range, and F is the F-number of the macro lens upon focused on an object point at infinity and upon stop in.

The macro lens of the present invention should preferably have a maximum magnification conforming to condition (5), and should have an upper-limit magnification of about −0.4. To achieve a magnification that is less than the lower limit of −1.0, it is required to increase the number of lens components or make the F-number large.

As the upper limit of 16° to condition (6) is so exceeded that the object range spreads, it is difficult to take photographs at an increased magnification unless the camera is as close to subjects as possible. Insofar as the range of this condition is satisfied, it would be easy to take photographs at an increased magnification while the camera is relatively close to subjects. As the lower limit of 7° is not reached, the focal length of the macro lens becomes long and so its total length becomes long; it is difficult to slim down the macro lens system.

A lens system departing from the range of condition (7) can no longer be referred to as a large-aperture lens. To meet condition (7) in particular, it is preferable to use an anomalous dispersion glass.

If the upper limit of 3.0 to condition (7) is down to 2.0 as mentioned below, it is then possible to obtain a faster lens system. This is particularly true for a large-aperture lens.

$$1.0 < F < 2.0 \tag{7}'$$

With a lens system having a magnification of about 0.5 like one contemplated herein, there is noticeable deterioration in its performance due to chromatic aberrations, although aberrations can be corrected at the design reference wavelength. According to the present invention wherein an anomalous dispersion glass is used in the rear of the stop, a large-aperture lens having an increased magnification can be achieved while corrected for longitudinal chromatic aberration and chromatic aberration of magnification.

As already explained, focusing is carried out by independent movement of the respective lens groups. In this case, however, the quantity of movement of the first lens group should preferably comply with the range defined below.

$$0.4 < \Delta d_1/f_L < 0.8 \tag{8}$$

Here $\Delta d_1$ is the quantity of movement of the first lens group upon focused from an object point at infinity to the closest object point, and $f_L$ is the focal length of the macro lens upon focused on an object point at infinity.

When the power of the first lens group is within the range defined by conditions (3-1) and (3-2), the quantity of movement of the first lens group must be greater than the lower limit of 0.4 to condition (8). Below that lower limit, it is impossible to carry out phototaking within the range defined by the upper limit of condition (5) or the macro lens fails to serve its own function. As the upper limit of 0.8 to condition (8) is exceeded, it may be possible to obtain high enough magnification for macro-photography; however, the quantity of movement of the first lens group becomes unacceptably large for mechanical construction.

Further, the lens system of the present invention should preferably comply with the following conditions (9) and (10).

$$13 \text{ mm} > IH > 10 \text{ mm} \tag{9}$$

$$3.5 > f_b/IH < 2.8 \tag{10}$$

Here IH is the radius of an image circle upon focused on an object point at infinity, and $f_b$ is the back focus of the macro lens system upon focused on an object point at infinity.

These conditions are to determine the space necessary for the location therein of a quick-return mirror, etc. Condition (9) determines the radius of the image circle that is herein assumed. The dimensions necessary for ensuring space on which the mirror is placed in view of layout are within the range of condition (10). As the lower limit of 2.8 to condition (10) is not reached, the mirror space becomes insufficient, and exceeding the upper limit of 3.5 to condition (10) is not preferable because the camera body becomes too large.

Furthermore, the macro lens system of the present invention should preferably comply with the following condition (11).

$$1° < |EW| < 11° \tag{11}$$

Here EW is the angle with an optical axis of an emergent ray from a diagonal chief ray incident at the maximum image height on the image pickup surface of a camera body upon focused on an object point at infinity, provided that when the image pickup range of the image pickup surface is arbitrarily variable, EW is a value found at a position where the image height maximizes in the possible widest range.

The macro lens system of the present invention may be applied to digital cameras. In this case, however, the angle of incidence of light on an image pickup device such as a CCD becomes a problem. As the angle of incidence of light on the CCD or the like is too large, insufficient light quantity due to oblique incidence becomes a matter of concern. Especially when the image height increases, the exit angle of the macro lens system increases, resulting in increased rim ray attenuation at the CCD or the like. To minimize light quantity reductions due to this rim-ray attenuation, it is required to comply with condition (11). Condition (11) defines the angle of the emergent ray from a diagonal chief ray with the optical axis, i.e., the absolute value of the exit angle of the diagonal chief ray. A CCD or the like, when used with the macro lens system of the present invention, should have its oblique incidence properties in coincidence with those of the macro lens system. To keep the rim-ray attenuation due to oblique incidence of light on the CCD or the like at practically acceptable levels, it is desired that the angle of incidence of the diagonal chief ray on the CCD or the like, i.e., the exit angle of the optical system does not depart from the range of condition (11).

The micro lens of the present invention may be used on silver-halide film cameras as well as on cameras using electronic image pickup devices such as solid-state image pickup devices or CCDs. It is also possible to rely on a mount (of the screw or bayonet type, for instance) in such a way as to make the macro lens attachable to or detachable from a camera body. Preferably in this case, the half view angle of incidence of diagonal light rays should comply with the aforesaid condition (6).

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 2(a) and 2(b) are schematics, similar to FIGS. 1(a) and 1(b), of Example 2 of the macro lens of the present invention.

FIG. 8 is illustrative in conception of the makeup of a digital type single-lens reflex camera in which the micro lens of the present invention is built.

DESCRIPTION OF THE PREFERRED EMBODIMENTS

Figures 1A, 1B:
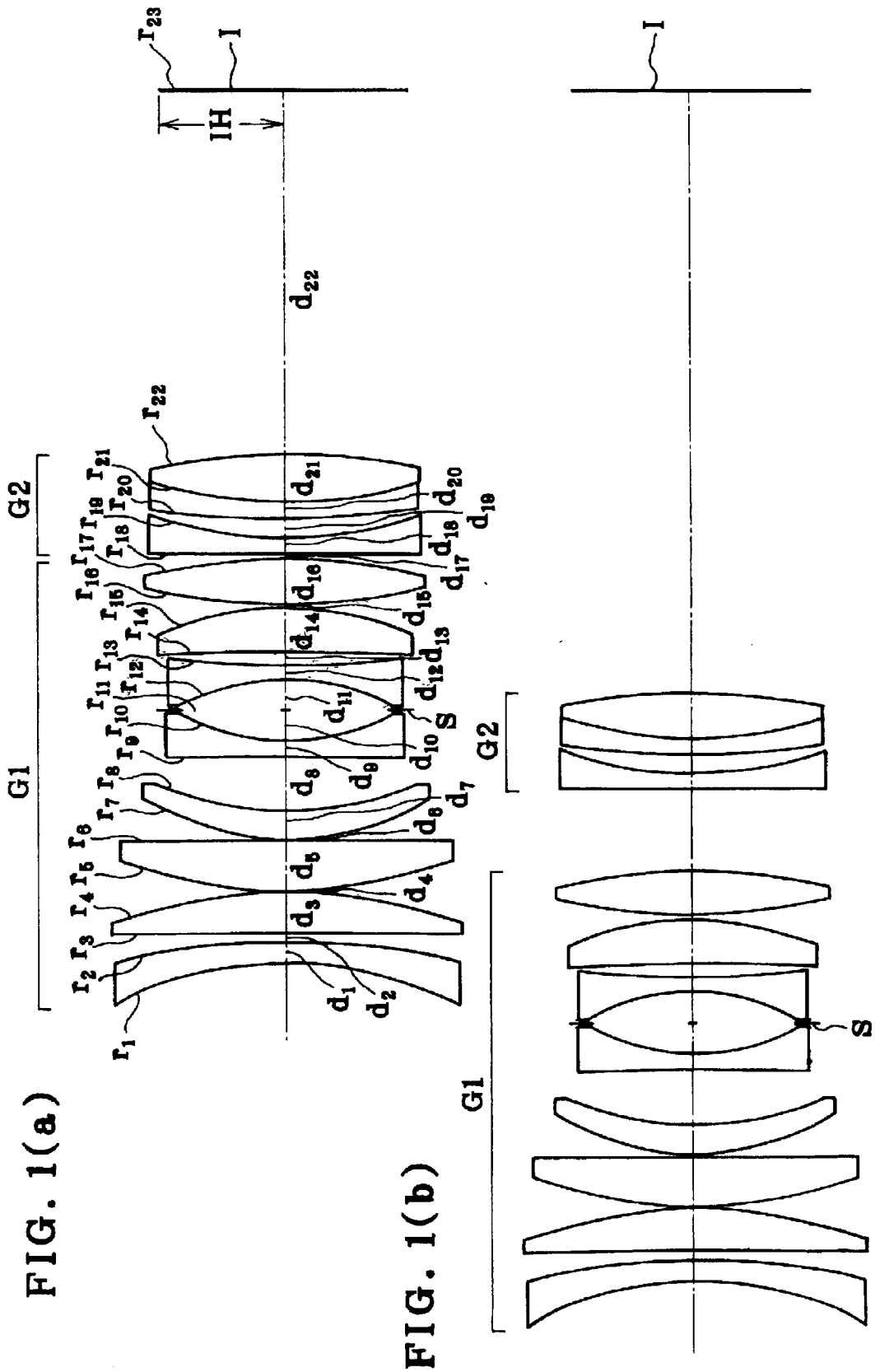
FIGS. 1(a) and 1(b) are illustrative in section of Example 1 of the macro lens of the present invention upon focused on an object point at infinity and at a magnification of −0.52.
Figures 3A, 3B:
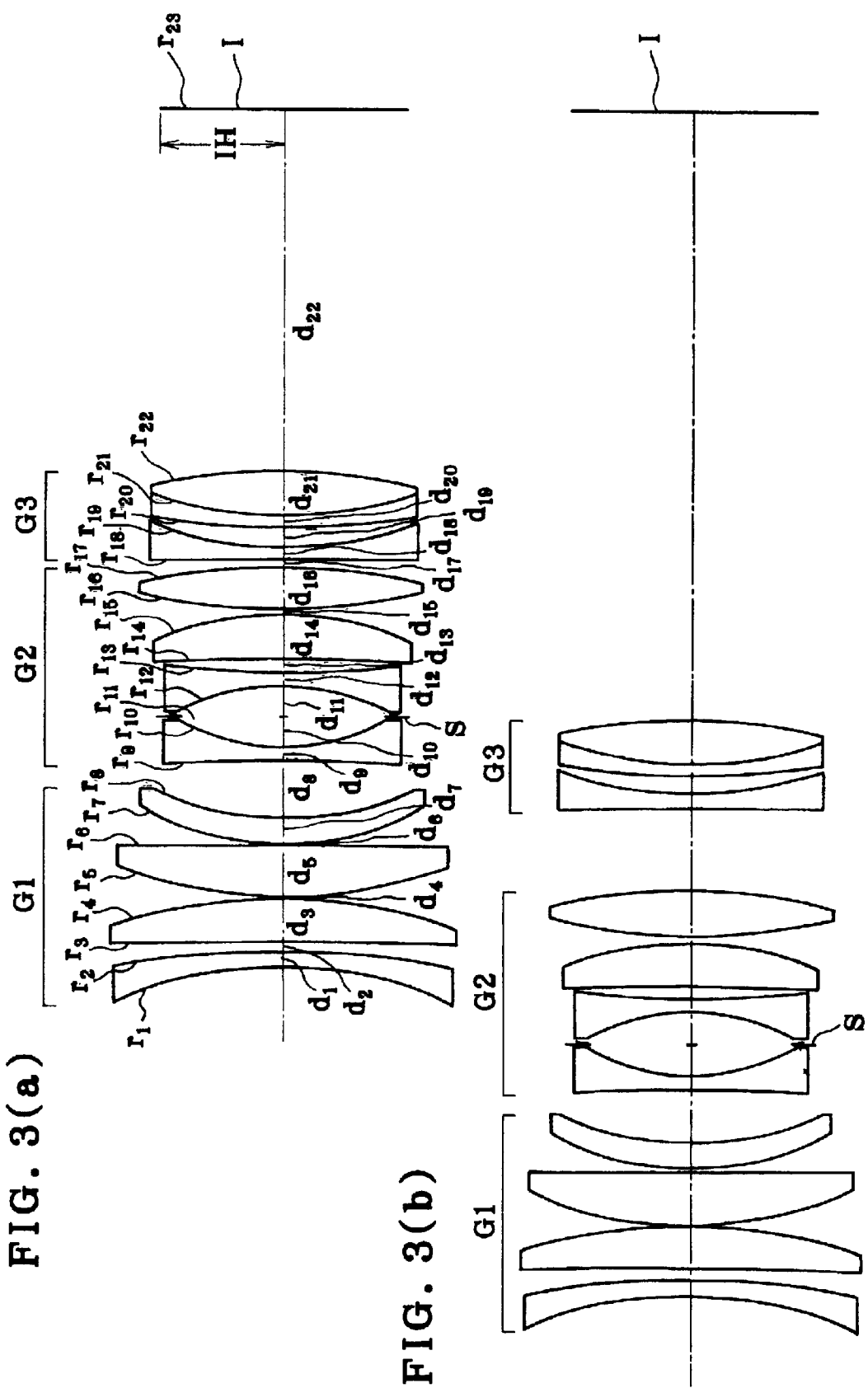
FIGS. 3(a) and 3(b) are schematics, similar to FIGS. 1(a) and 1(b), of Example 3 of the macro lens of the present invention.

Examples 1, 2 and 3 of the macro lens of the present invention are now given. Sectional lens arrangements of Examples 1, 2 and 3 upon focused (a) on an object point at infinity and (b) at a magnification of −0.52 are shown in FIGS. 1, 2 and 3, respectively. Throughout the drawings, G1, G2, G3, S and I stand for the first lens group, second lens group, third lens group, stop and image plane, respectively.

Example 1 of the macro lens of the present invention is shown in FIGS. 1(*a*) and 1(*b*). The first lens group G1 is made up of, in order from its object side, a first lens component that is a negative meniscus lens concave on its object side, a second lens component that is a positive meniscus lens concave on its object side, a third lens component that is a double-convex positive lens, a fourth lens component that is a positive meniscus lens convex on its object side, a fifth lens component that is a double-concave negative lens, a stop, a sixth lens component that is a double-concave negative lens, a seventh lens component that is a positive meniscus lens convex on its image side and an eighth lens component that is a double-convex positive lens, and the second lens group is made up of a ninth lens component that is a negative meniscus lens concave on its image side and a tenth lens component that is a negative meniscus lens concave on its image side.

Focusing on a nearby object point is carried out by independent movement of the first lens group and the second lens group toward the object side of the macro lens.

In this example, the image height is IH: 11.1 mm, and the pixels of a CCD located at the image plane I have a pitch of 5.5 μm.

Example 2 of the macro lens of the present invention is shown in FIG. 2. The first lens group G1 is made up of, in order from its object side, a first lens component that is a negative meniscus lens concave on its object side, a second lens component that is a negative meniscus lens concave on its object side, a third lens component that is a positive meniscus lens convex on its object side, a fourth lens component that is a positive meniscus lens convex on its object side, a fifth lens component that is a double-concave negative lens, a stop, a sixth lens component that is a double-concave negative lens, a seventh lens component that is a positive meniscus lens convex on its object side and an eighth lens component that is a double-convex positive lens, and the second lens group is made up of a ninth lens component that is a negative meniscus lens concave on its image side and a tenth lens component that is a doublet positive lens consisting of a negative meniscus lens concave on its image side and a double-convex positive lens.

Focusing on a nearby object point is carried out by independent movement of the first lens group and the second lens group toward the object side of the macro lens.

In this example, the image height is IH: 11.1 mm, and the pixels of a CCD located at the image plane I have a pitch of 5.5 μm.

Example 3 of the macro lens of the present invention is shown in FIGS. 3(*a*) and 3(*b*). The first lens group G1 is made up, in order from its object side, a first lens component that is a negative meniscus lens concave on its object side, a second lens component that is a positive meniscus lens concave on its object side, a third lens component that is a double-convex positive lens and a fourth lens component that is a positive meniscus lens convex on its object side, the second lens group is made up of a fifth lens component that is a double-concave negative lens, a stop, a sixth lens that is a double-concave negative lens, a seventh lens component that is a positive meniscus lens convex on its image side and an eighth lens component that is a double-convex positive lens, and the third lens group is made up of a ninth lens component that is a negative meniscus lens concave on its image side and a tenth lens component that consists of a negative meniscus lens concave on its image side and a double-convex positive lens.

Focusing on a nearby object point is carried out by independent movement of the first lens group, the second lens group and the third lens group toward the object side of the macro lens.

In this example, the image height is IH: 11.1 mm, and the pixels of a CCD located at the image plane I have a pitch of 5.5 μm.

Numerical data on each of the aforesaid examples are given below. The symbols used hereinafter but not hereinbefore have the following meanings.

$F_{NO}$ is an F-number, M is a magnification, $r_1, r_2, \ldots$ are the radii of curvature of the respective lens surfaces, $d_1, d_2, \ldots$ are the spacing between adjacent lens surfaces, $n_{d1}, n_{d2}, \ldots$ are the d-line refractive indices of the respective lenses, and $v_{d1}, v_{d2}, \ldots$ are the Abbe numbers of the respective lenses.

EXAMPLE 1

| | | | |
|---|---|---|---|
| $r_1 = -35.629$ | $d_1 = 2.00$ | $n_{d1} = 1.64769$ | $v_{d1} = 33.79$ |
| $r_2 = -74.905$ | $d_2 = 0.94$ | | |
| $r_3 = -702.420$ | $d_3 = 4.03$ | $n_{d2} = 1.77250$ | $v_{d2} = 49.60$ |
| $r_4 = -49.343$ | $d_4 = 0.10$ | | |
| $r_5 = 45.810$ | $d_5 = 5.06$ | $n_{d3} = 1.72916$ | $v_{d3} = 54.68$ |
| $r_6 = -809755.657$ | $d_6 = 0.10$ | | |
| $r_7 = 26.150$ | $d_7 = 2.80$ | $n_{d4} = 1.52249$ | $v_{d4} = 59.84$ |
| $r_8 = 32.770$ | $d_8 = 5.55$ | | |
| $r_9 = -311.668$ | $d_9 = 1.41$ | $n_{d5} = 1.59551$ | $v_{d5} = 39.24$ |
| $r_{10} = 21.286$ | $d_{10} = 3.13$ | | |
| $r_{11} = \infty$ (Stop) | $d_{11} = 3.08$ | | |
| $r_{12} = -21.101$ | $d_{12} = 1.35$ | $n_{d6} = 1.58144$ | $v_{d6} = 40.75$ |
| $r_{13} = 93.106$ | $d_{13} = 1.30$ | | |
| $r_{14} = -323.070$ | $d_{14} = 4.50$ | $n_{d7} = 1.49700$ | $v_{d7} = 81.54$ |
| $r_{15} = -30.291$ | $d_{15} = 0.30$ | | |
| $r_{16} = 56.785$ | $d_{16} = 4.54$ | $n_{d8} = 1.77250$ | $v_{d8} = 49.60$ |
| $r_{17} = -56.785$ | $d_{17} =$ (Variable) | | |
| $r_{18} = 5517.326$ | $d_{18} = 1.52$ | $n_{d9} = 1.51742$ | $v_{d9} = 52.43$ |
| $r_{19} = 38.046$ | $d_{19} = 1.93$ | | |
| $r_{20} = 91.845$ | $d_{20} = 1.55$ | $n_{d10} = 1.76182$ | $v_{d10} = 26.52$ |
| $r_{21} = 40.260$ | $d_{21} = 4.87$ | $n_{d11} = 1.74100$ | $v_{d11} = 52.64$ |
| $r_{22} = -60.775$ | $d_{22} =$ (Variable) | | |
| $r_{23} = \infty$ (Image Plane) | | | |

| | | | |
|---|---|---|---|
| $f_L$ | 51.000 | | |
| $F_{NO}$ | 1.83 | | |
| M | −1/∞ | −0.1 | −0.52 |
| $d_{17}$ | 0.50 | 2.08 | 8.02 |
| $d_{22}$ | 35.18 | 39.37 | 58.83 |

EXAMPLE 2

| | | | |
|---|---|---|---|
| $r_1 = -35.941$ | $d_1 = 2.00$ | $n_{d1} = 1.64769$ | $v_{d1} = 33.79$ |
| $r_2 = -70.445$ | $d_2 = 1.40$ | | |
| $r_3 = -910.133$ | $d_3 = 3.99$ | $n_{d2} = 1.77250$ | $v_{d2} = 49.60$ |
| $r_4 = -51.742$ | $d_4 = 0.10$ | | |

-continued

| | | | |
|---|---|---|---|
| $r_5 = 43.701$ | $d_5 = 4.34$ | $n_{d3} = 1.72916$ | $\nu_{d3} = 54.68$ |
| $r_6 = 3929264.108$ | $d_6 = 0.10$ | | |
| $r_7 = 24.021$ | $d_7 = 2.80$ | $n_{d4} = 1.52249$ | $\nu_{d4} = 59.84$ |
| $r_8 = 28.431$ | $d_8 = 5.16$ | | |
| $r_9 = -861.896$ | $d_9 = 1.30$ | $n_{d5} = 1.59551$ | $\nu_{d5} = 39.24$ |
| $r_{10} = 19550$ | $d_{10} = 3.31$ | | |
| $r_{11} = \infty$ (Stop) | $d_{11} = 5.78$ | | |
| $r_{12} = -20.465$ | $d_{12} = 1.35$ | $n_{d6} = 1.58144$ | $\nu_{d6} = 40.75$ |
| $r_{13} = 99.536$ | $d_{13} = 0.91$ | | |
| $r_{14} = -257.770$ | $d_{14} = 4.50$ | $n_{d7} = 1.49700$ | $\nu_{d7} = 81.54$ |
| $r_{15} = -28.944$ | $d_{15} = 0.30$ | | |
| $r_{16} = 53.287$ | $d_{16} = 6.17$ | $n_{d8} = 1.77250$ | $\nu_{d8} = 49.60$ |
| $r_{17} = -59.475$ | $d_{17} =$ (Variable) | | |
| $r_{18} = -17636653.385$ | $d_{18} = 1.38$ | $n_{d9} = 1.51742$ | $\nu_{d9} = 52.43$ |
| $r_{19} = 36.329$ | $d_{19} = 1.73$ | | |
| $r_{20} = 96.180$ | $d_{20} = 1.68$ | $n_{d10} = 1.76182$ | $\nu_{d10} = 26.52$ |
| $r_{21} = 40.845$ | $d_{21} = 4.86$ | $n_{d11} = 1.74100$ | $\nu_{d11} = 52.64$ |
| $r_{22} = -53.026$ | $d_{22} =$ (Variable) | | |
| $r_{23} = \infty$ (Image Plane) | | | |

| | | | |
|---|---|---|---|
| $f_L$ | 51.009 | | |
| $F_{NO}$ | 1.83 | | |
| M | $-1/\infty$ | $-0.1$ | $-0.52$ |
| $d_{17}$ | 0.50 | 1.71 | 6.79 |
| $d_{22}$ | 35.06 | 39.46 | 58.75 |

EXAMPLE 3

| | | | |
|---|---|---|---|
| $r_1 = -37.956$ | $d_1 = 1.52$ | $n_{d1} = 1.64769$ | $\nu_{d1} = 33.79$ |
| $r_2 = -83.532$ | $d_2 = 1.00$ | | |
| $r_3 = -534.319$ | $d_3 = 4.08$ | $n_{d2} = 1.77250$ | $\nu_{d2} = 49.60$ |
| $r_4 = -51.466$ | $d_4 = 0.10$ | | |
| $r_5 = 42.553$ | $d_5 = 5.08$ | $n_{d3} = 1.72916$ | $\nu_{d3} = 54.68$ |
| $r_6 = -171439725.185$ | $d_6 = 0.10$ | | |
| $r_7 = 25.634$ | $d_7 = 2.80$ | $n_{d4} = 1.52249$ | $\nu_{d4} = 59.84$ |
| $r_8 = 31.696$ | $d_8 =$ (Variable) | | |
| $r_9 = -296.224$ | $d_9 = 1.30$ | $n_{d5} = 1.59551$ | $\nu_{d5} = 39.24$ |
| $r_{10} = 20.553$ | $d_{10} = 3.13$ | | |
| $r_{11} = \infty$ (Stop) | $d_{11} = 3.08$ | | |
| $r_{12} = -21.557$ | $d_{12} = 1.35$ | $n_{d6} = 1.58144$ | $\nu_{d6} = 40.75$ |
| $r_{13} = 102.583$ | $d_{13} = 1.21$ | | |
| $r_{14} = -308.613$ | $d_{14} = 4.50$ | $n_{d7} = 1.49700$ | $\nu_{d7} = 81.54$ |
| $r_{15} = -30.433$ | $d_{15} = 0.30$ | | |
| $r_{16} = 53.387$ | $d_{16} = 4.51$ | $n_{d8} = 1.77250$ | $\nu_{d8} = 49.60$ |
| $r_{17} = -61.253$ | $d_{17} =$ (Variable) | | |
| $r_{18} = 116624.465$ | $d_{18} = 1.38$ | $n_{d9} = 1.51742$ | $\nu_{d9} = 52.43$ |
| $r_{19} = 36.250$ | $d_{19} = 1.94$ | | |
| $r_{20} = 83.298$ | $d_{20} = 1.20$ | $n_{d10} = 1.76182$ | $\nu_{10} = 26.52$ |
| $r_{21} = 38.827$ | $d_{21} = 4.19$ | $n_{d11} = 1.74100$ | $\nu_{11} = 52.64$ |
| $r_{22} = -61.075$ | $d_{22} =$ (Variable) | | |
| $r_{23} = \infty$ (Image Plane) | | | |

| | | | |
|---|---|---|---|
| $f_L$ | 51.000 | | |
| $F_{NO}$ | 1.83 | | |
| M | $-1/\infty$ | $-0.1$ | $-0.52$ |
| $d_8$ | 5.57 | 5.55 | 5.18 |
| $d_{17}$ | 0.50 | 2.09 | 8.17 |
| $d_{22}$ | 35.19 | 39.41 | 59.67 |

Figure 4A:
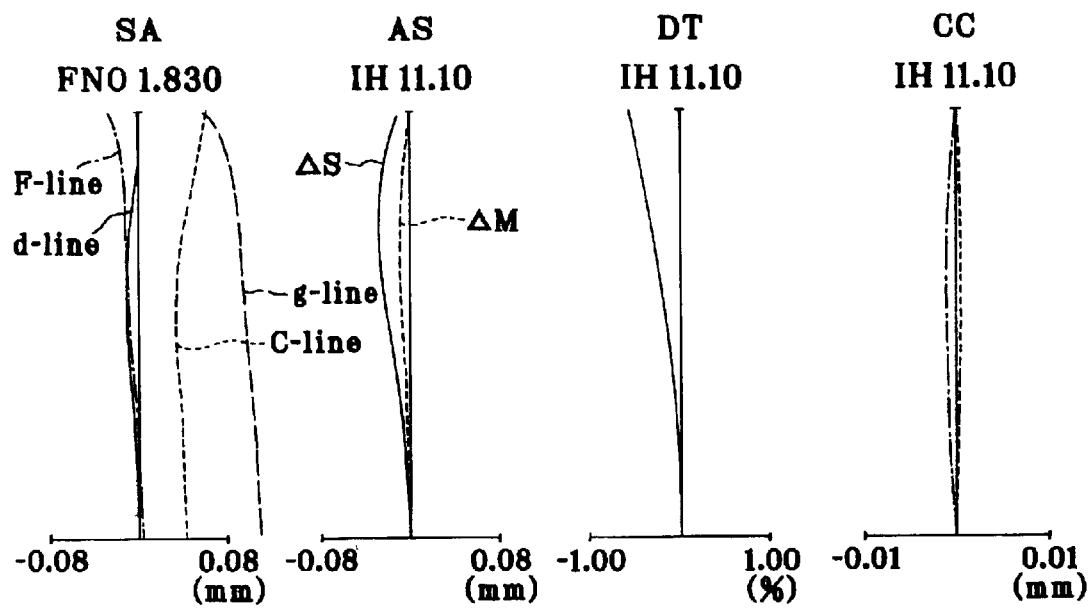
FIGS. 4(a) and 4(b) are aberration diagrams for Example 1 upon focused at infinity and a magnification of −0.52.
Figure 4B:
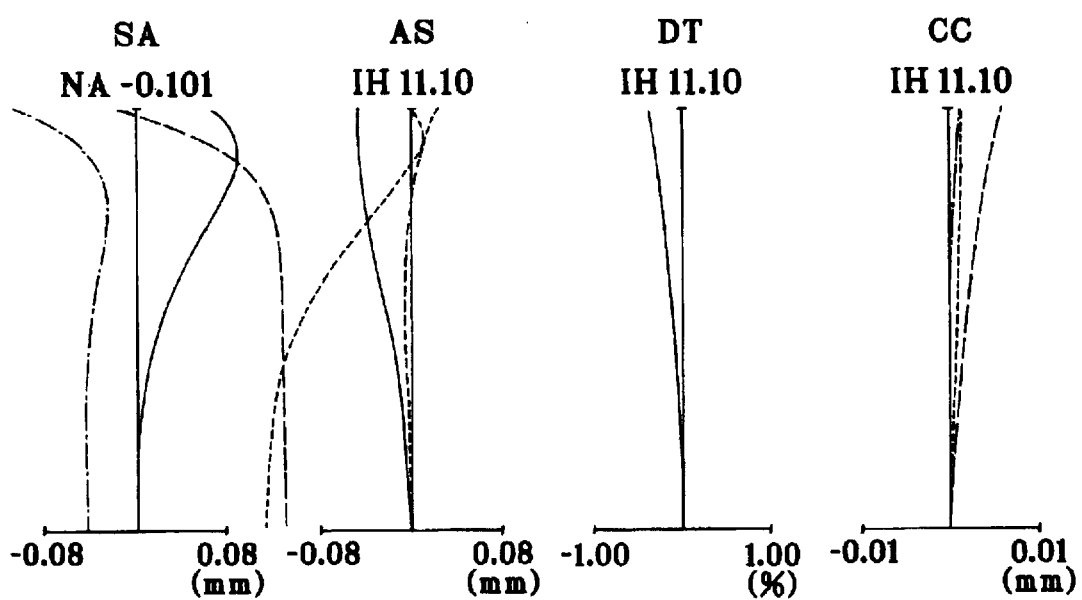
Figure 5A:
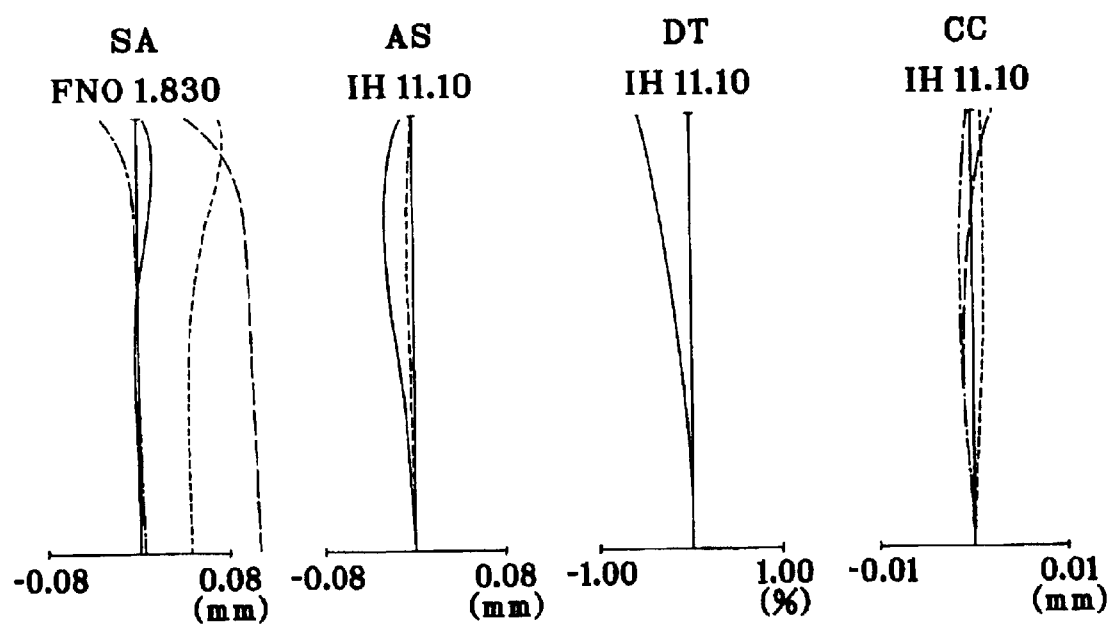
FIGS. 5(a) and 5(b) are aberration diagrams for Example 2, similar to FIGS. 4(a) and 4(b).
Figure 5B:
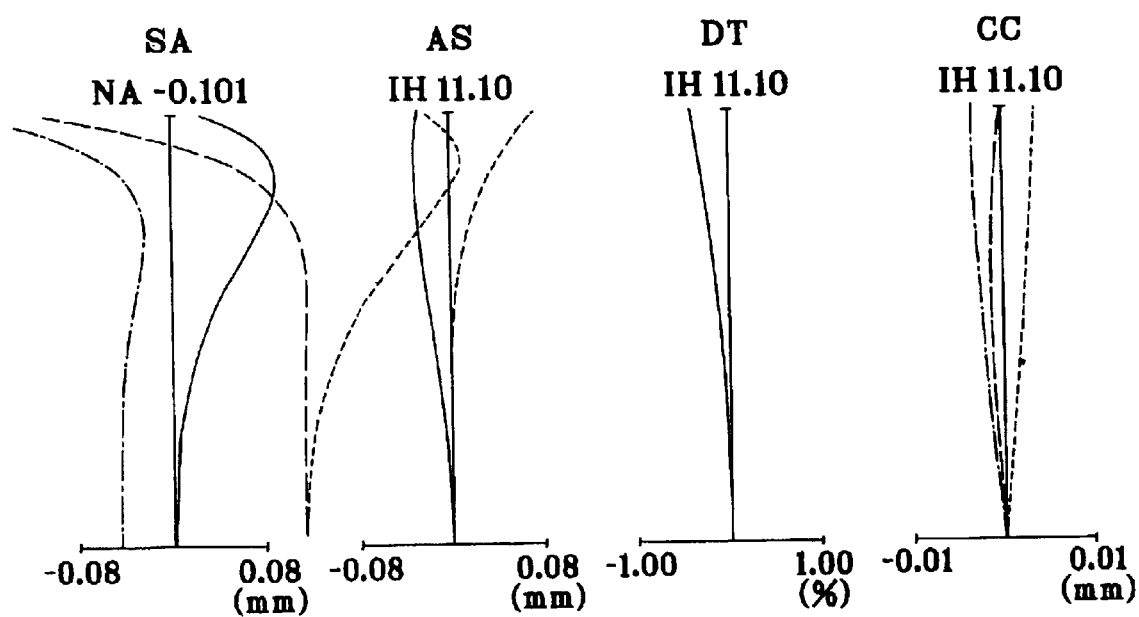
Figure 6A:
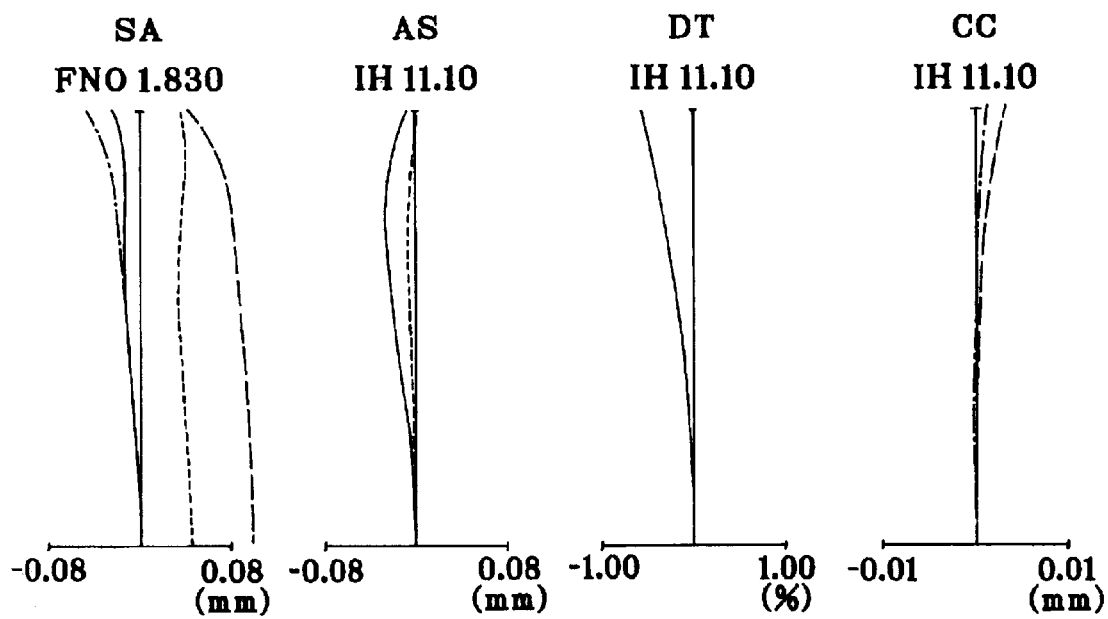
FIGS. 6(a) and 6(b) are aberration diagrams for Example 3, similar to FIGS. 4(a) and 4(b).
Figure 6B:
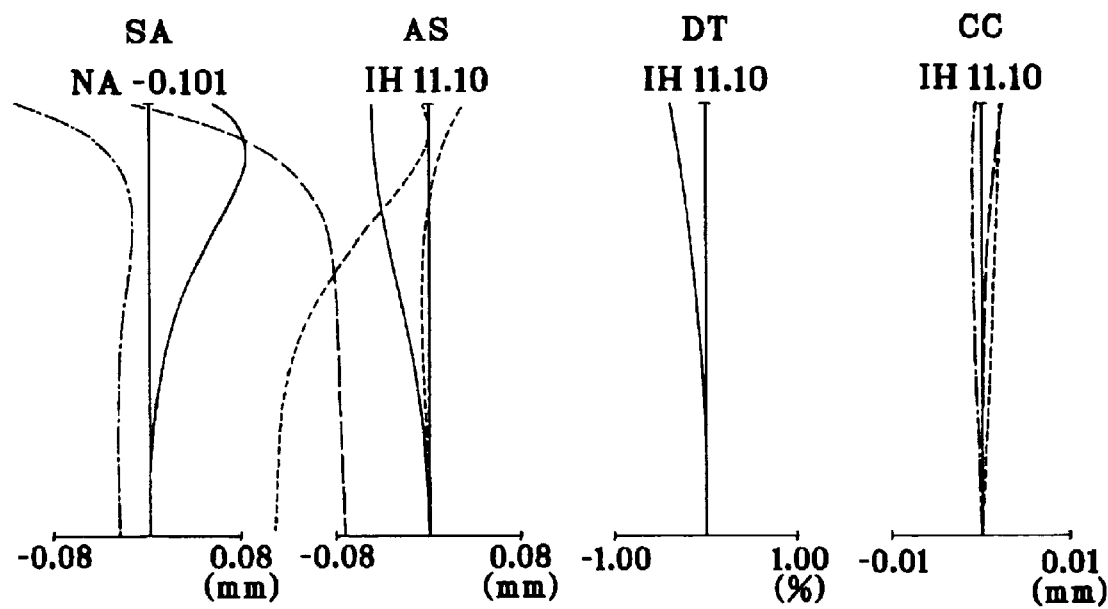

Aberration diagrams for Examples 1 to 3 upon focused (a) at infinity and (b) at a magnification of −0.52 are shown in FIGS. 4, 5 and 6, respectively. In these diagrams, "SA", "AS", "DT" and "CC" represent spherical aberrations, astigmatisms, distortions and chromatic aberrations of magnification, respectively. "IH" indicates an image height.

Set out below are the values of conditions (1) to (11) in each of the aforesaid examples. It is here noted that conditions (3) and (4) mean condition (3-1) or (3-2), and condition (4-1) or (4-2), respectively.

| Example | 1 | 2 | 3 |
|---|---|---|---|
| (1) | −2.10 | −2.27 | −2.13 |
| (2) | −2.81 | −3.08 | −2.63 |
| (3) | 1.26 | 1.30 | 0.70 |
| (4) | 2.71 | 2.45 | 2.71 |
| (5) | −0.52 | −0.52 | −0.52 |
| (6) | 13.3 | 13.3 | 13.3 |
| (7) | 1.83 | 1.83 | 1.83 |
| (8) | 0.61 | 0.59 | 0.62 |
| (9) | 11.1 | 11.1 | 11.1 |
| (10) | 3.15 | 3.15 | 3.16 |
| (11) | 9.45 | 7.97 | 9.68 |

The macro lens of the present invention as described above is applicable to silver-halide or digital single-lens reflex cameras, as exemplified below.

Figure 7:
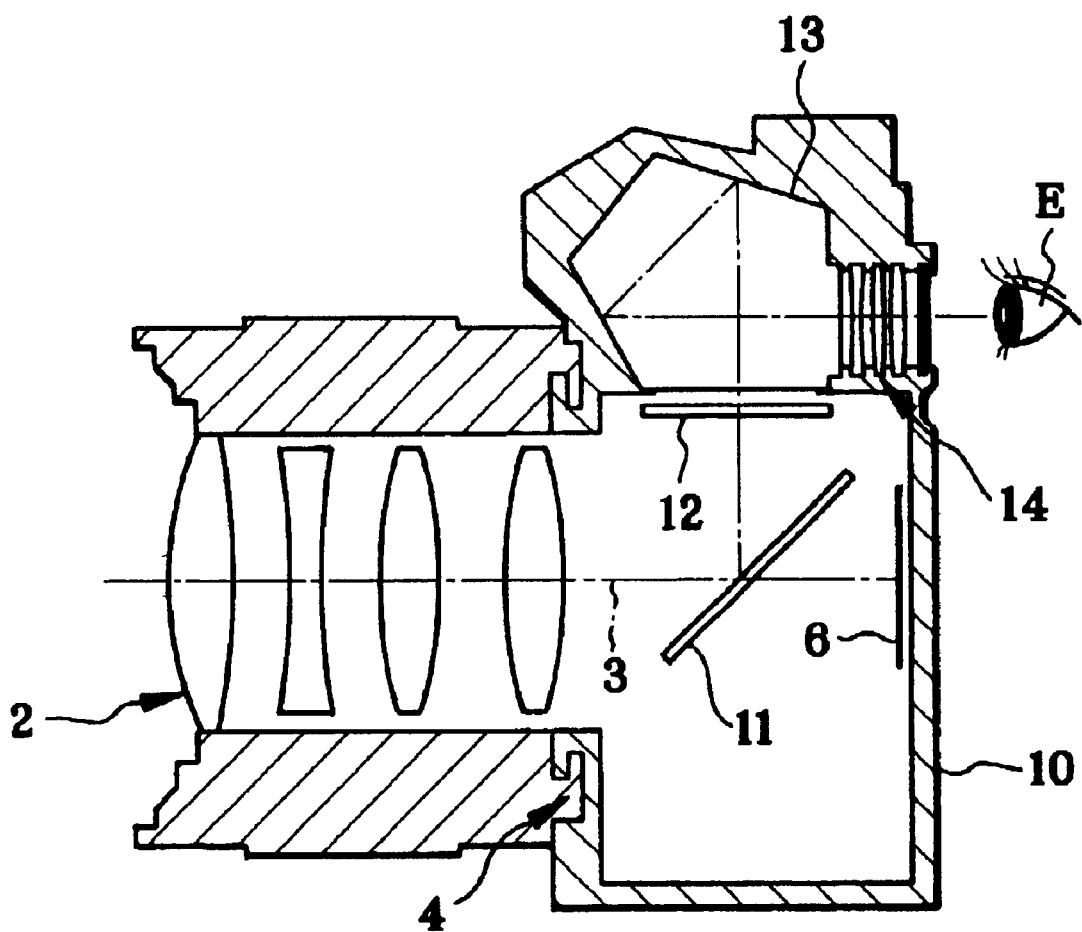
FIG. 7 is illustrative in schematic of the construction of a silver-halide type single-lens reflex camera in which the macro lens of the present invention is used as a phototaking lens.

FIG. 7 is illustrative of a silver-halide type single-lens reflex camera using the macro lens of the present invention as a phototaking lens. In FIG. 7, reference numeral 10 is a single-lens reflex camera, 2 a phototaking lens, and 4 a mount (that may be of the screw or bayonet type) for attaching or detaching the phototaking lens 2 to or from the single-lens reflex camera 10 (in this case, the bayonet type is used). Reference numeral 6 is a film, 11 a quick-return mirror interposed between the lens system 2 and the film 6 on the optical axis of the phototaking lens 2, 12 is a finder screen located on an optical path taken by light reflected by the quick-return mirror, 13 a penta prism, 14 a finder, and E the eye of an observer (eye point). The micro lens of the present invention is used as the phototaking lens 2 for the thus constructed single-lens reflex camera 10.

FIG. 8(a) is illustrative in conception of an objective optical system of a digital type single-lens reflex camera, in which the macro lens of the present invention is built. In this case, the macro lens of Example 1 is used as the objective optical system 21. An image-formation light beam passing through the objective optical system 21 is split through a half-silvered mirror prism (a beam splitter or the like) 22 into a phototaking optical path and a finder optical path. It is here preferable to use a quick-return mirror instead of the half-silvered mirror prism 22, because light quantity loses are prevented. Filters F such as a low-pass filter and an infrared cut filter and a CCD 23 are inserted into the phototaking optical path, so that an object image is formed on the image pickup surface of CCD 23 through the filters F. The finder optical path is provided with a screen mat 24 on the primary image plane formed at a position conjugate with that image pickup surface, so that the primary image is reflected at a plane mirror 25 and relayed as the secondary image through a relay optical system 26 for erection. Then, this secondary image is guided through an eyepiece lens 27 to the eyeball E of an observer.

Regarding the finder optical path portion of FIG. 8(a), the plane mirror 25 and relay optical system 26 may be replaced by a concave mirror 28 having positive power, as shown in FIG. 8(b). With this arrangement, it is possible to reduce the number of parts and achieve compactness. It is here understood that in the concave mirror prism 28, both the entrance surface and the exit surface may have power or, alternatively, the entrance surface may be configured not only as a rotationally symmetric surface (such as a spherical or aspheric surface) or as a rotationally asymmetric surface (such as an anamorphic or free-form surface. If a silver-halide film is used instead of CCD 23, it is then possible to construct a silver-halide camera.

As can be seen from the foregoing, the present invention can provide a large-aperture macro lens that has an F-number of 1.8 and is well corrected for aberrations every range from infinity to close range.

I claim:

1. A macro lens, which comprises, in order from an object side thereof, a first lens group having positive power and a second lens group having positive power, wherein in said first lens group a negative meniscus lens component concave on an object side thereof is located nearest to an object side of said first lens group, and upon focusing from an object point at infinity to a closest object point, said first lens group and said second lens group move independently toward the object side of the macro lens while a spacing therebetween varies.

2. The macro lens according to claim 1, wherein a stop is located in said first lens group.

3. The macro lens according to claim 2, wherein between said negative meniscus lens component and said stop there are provided a plurality of positive lens components.

4. The macro lens according to claim 2, wherein lens components located just before and just after said stop are defined by negative lens components.

5. The macro lens according to claim 1, wherein said first lens group having positive power comprises, in order from an object side thereof, a negative meniscus lens component concave on an object side thereof, a positive lens group, a positive lens component in which an object-side surface thereof is smaller in terms of the absolute value of a radius of curvature than an image-side surface thereof, a negative lens component in which an image-side surface thereof is smaller in terms of the absolute value of a radius of curvature than an object-side surface thereof, a stop, a negative lens component in which an object-side surface thereof is smaller in terms of the absolute value of a radius of curvature than an image-side surface thereof, and a positive lens component in which an image-side surface thereof is smaller in terms of the absolute value of a radius of curvature than an object-side surface thereof.

6. The macro lens according to claim 1, wherein said second lens group comprises a doublet positive lens component in which a positive lens element and a negative lens element are cemented together.

7. A macro lens, which comprises, in order from an object side thereof, a first lens group having positive power, a second lens group having negative power and a third lens group having positive power, wherein in said first lens group a negative meniscus lens component concave on an object side thereof is located nearest to an object side of the first lens group, and upon focusing from an object point at infinity to a closest object point, the lens groups move independently toward the object side of the macro lens while a spacing between adjacent lens group varies.

8. The macro lens according to claim 7, wherein a stop is located in said second lens group.

9. The macro lens according to claim 8, wherein said first lens group comprises a plurality of positive lens components on an image side of said negative meniscus lens component.

10. The macro lens according to claim 8, wherein lens components located just before and just after said stop are defined by negative lens components.

11. The macro lens according to claim 7, wherein a combined lens system comprising said first lens group having positive power and said second lens group having negative power comprises, in order from an object side thereof, a negative meniscus lens component concave on an object side thereof, a positive lens group, a positive lens component in which an object-side surface thereof is smaller in terms of the absolute value of a radius of curvature than an image-side surface thereof, a negative lens component in which an image-side surface thereof is smaller in terms of the absolute value of a radius of curvature than an object-side surface thereof, a stop, a negative lens component in which an object-side surface thereof is smaller in terms of the absolute value of a radius of curvature than an image-side surface thereof, and a positive lens component in which an image-side surface thereof is smaller in terms of the absolute value of a radius of curvature than an object-side surface thereof.

12. The macro lens according to claim 7, wherein said third lens group comprises a doublet positive lens component in which a positive lens element and a negative lens element are cemented together.

13. The macro lens according to claim 1 or 7, which satisfies the following conditions (3-1) and (4-1):

$$0.5 < f_1/f_L < 1.8 \quad (3\text{-}1)$$

$$1.8 < f_2/f_L < 3.5 \quad (4\text{-}1)$$

where $f_1$ is a focal length of the first lens group, $f_2$ is a focal length of the second lens group, and $f_L$ is a focal length of the macro lens upon focused on an object point at infinity.

14. The macro lens according to claim 7, which satisfies the following conditions (3-2) and (4-2):

$$0.5 < f_1/f_L < 1.8 \quad (3\text{-}2)$$

$$1.8 < f_3/f_L < 3.5 \quad (4\text{-}2)$$

where $f_1$ is a focal length of the first lens group, $f_3$ is a focal length of the third lens group, and $f_L$ is a focal length of the macro lens upon focused on an object point at infinity.

15. The macro lens according to claim 1 or 7, which satisfies the following condition (1):

$$-4 < f_F/f_L < -1 \quad (1)$$

where $f_F$ is a focal length of the negative meniscus lens component located nearest to the object side of the macro lens, and $f_L$ is a focal length of the macro lens upon focused on an object point at infinity.

16. The macro lens according to claim 1 or 7, which satisfies the following condition (2):

$$-12.5 < (r_1+r_2)/(r_1-r_2) < -0.85 \quad (2)$$

where $r_1$ is a radius of curvature of an object-side surface of the negative meniscus lens located nearest to the object side of the macro lens, and $r_2$ is a radius of curvature of an image-side surface of the negative meniscus lens located nearest to the object side of the macro lens.

17. The macro lens according to claim 1 or 7, which satisfies the following condition (5) upon focused on a closes object point:

$$-1.0 < MG < -0.4 \quad (5)$$

where MG is a maximum magnification.

18. The macro lens according to claim 1 or 7, which satisfies the following condition (7):

$$1.0 < F < 3.0 \quad (7)$$

where F is an F-number of the macro lens upon focused on an object point at infinity and upon stop in.

19. The macro lens according to claim 1 or 7, which satisfies the following condition (8):

$$0.4 < \Delta d_1/f_L < 0.8 \tag{8}$$

where $\Delta d_1$ is a quantity of movement of the first lens group upon focused from an object point at infinity to a closest object point, and $f_L$ is a focal length of the macro lens upon focused on an object point at infinity.

20. A camera, which comprises a macro lens as recited in claim 1 or 7, and an image pickup range-limiting mechanism that is located on an image side of the macro lens.

21. The camera according to claim 20, which satisfies the following condition (6):

$$7° \leq SW < 16° \tag{6}$$

where SW is a halt view angle of incidence of a diagonal ray on a maximum image height in an image pickup range of a camera body upon focused at infinity, provided that when the image pickup range of an image pickup surface is arbitrarily variable, SW is a maximum value in a possible widest range.

22. The camera according to claim 20, wherein said image pickup range-limiting mechanism is defined by a field stop comprising a rectangular aperture.

23. The camera according to claim 20, wherein said image pickup range-limiting mechanism is defined by an electronic image pickup device having a rectangular image pickup area.

24. The macro lens according to claim 1 or 7, which comprises a camera body configured in such a way as to satisfy the following condition (6) and a mount that is attachable to or detachable from said camera body:

$$7° \leq SW < 16° \tag{6}$$

where SW is a half view angle of incidence of a diagonal ray on a maximum image height in an image pickup range of a camera body upon focused at infinity, provided that when the image pickup range of an image pickup surface is arbitrarily variable, SW is a maximum value in a possible widest range.

25. The macro lens according to claim 1 or 7, which satisfies the following conditions (9) and (10):

$$13 \text{ mm} > IH > 10 \text{ mm} \tag{9}$$

$$3.5 > f_b/IH < 2.8 \tag{10}$$

where IH is a radius of an image circle upon focused on an object point at infinity, and fb is a back focus of the macro lens upon focused on an object point at infinity.

26. The camera according to claim 23, which satisfies the following condition (11):

$$1° < |EW| < 11° \tag{11}$$

where EW is an angle with an optical axis of an emergent ray from a diagonal chief ray incident at a maximum image height on an image pickup surface of a camera body upon focused on an object point at infinity, provided that when an image pickup range of the image pickup surface is arbitrarily variable, EW is a value found at a position where an image height maximizes in a possible widest range.

* * * * *